(12) United States Patent
Sastry et al.

(10) Patent No.: US 7,644,079 B2
(45) Date of Patent: *Jan. 5, 2010

(54) SYSTEM AND METHOD FOR TEMPORAL DATA MINING

(75) Inventors: Pidaparthy S. Sastry, Bangalore (IN); Srivatsan Laxman, Bangalore (IN); Kootaala P. Unnikrishnan, Birmingham, MI (US)

(73) Assignee: GM Global Technology Operations, inc., Detroit, MI (US)

( * ) Notice: Subject to any disclaimer, the term of this patent is extended or adjusted under 35 U.S.C. 154(b) by 928 days.

This patent is subject to a terminal disclaimer.

(21) Appl. No.: 11/068,505

(22) Filed: Feb. 28, 2005

(65) Prior Publication Data

US 2006/0195423 A1     Aug. 31, 2006

(51) Int. Cl.
 G06F 17/00    (2006.01)
 G06F 12/00    (2006.01)
 G06N 5/02     (2006.01)

(52) U.S. Cl. ............... 707/6; 707/102; 707/200; 706/48

(58) Field of Classification Search ............... 707/1, 707/6, 7, 100, 104.1, 200; 706/48
 See application file for complete search history.

(56) References Cited

U.S. PATENT DOCUMENTS

| 5,819,266 | A | 10/1998 | Agrawal et al. | |
|---|---|---|---|---|
| 6,189,005 | B1 * | 2/2001 | Chakrabarti et al. | 707/6 |
| 6,473,757 | B1 * | 10/2002 | Garofalakis et al. | 707/6 |
| 6,775,675 | B1 * | 8/2004 | Nwabueze et al. | 707/100 |
| 6,907,426 | B2 * | 6/2005 | Hellerstein et al. | 707/6 |
| 6,990,486 | B2 * | 1/2006 | Ma et al. | 707/6 |
| 6,996,551 | B2 * | 2/2006 | Hellerstein et al. | 706/48 |
| 2006/0265406 | A1 * | 11/2006 | Chkodrov et al. | 707/100 |

OTHER PUBLICATIONS

R. Agrawal and R. Srikant, "Mining sequential patterns," in Proc. 11th Intl Conf. on Data Eng., (Taipei, Taiwan), IEEE Computer Society, Washington, DC, USA, Mar. 1995.

J. Alon et al., "Discovering Clusters in motion time series data," in Proc. 2003 IEEE Computer Society Conf. on CVPR, (Madison, Wisconsin), pp. I-375-I-381, Jun. 18-20, 2003.

G. Casas-Garriga, "Discovering unbounded episodes in sequential data," in Proceedings of the 7th European Conference on Principles and Practice of Knowledge Discovery in Databases (PKDD'03), (Cavtat-Dubvrovnik, Croatia), pp. 83-94, 2003.

R. Gwadera, et al. "Reliable detection of episodes in event sequences," in Proc. 3rd IEEE Intl. Conf. on Data Mining (ICDM 2003), pp. 67-74, Nov. 19-23, 2003.

(Continued)

*Primary Examiner*—Miranda Le
(74) *Attorney, Agent, or Firm*—John A. Miller; Miller IP Group, PLC (57) ABSTRACT

A system for temporal data mining includes a computer readable medium having an application configured to receive at an input module a temporal data series and a threshold frequency. The system is further configured to identify, using a candidate identification and tracking module, one or more occurrences in the temporal data series of a candidate episode and increment a count for each identified occurrence. The system is also configured to produce at an output module an output for those episodes whose count of occurrences results in a frequency exceeding the threshold frequency.

9 Claims, 6 Drawing Sheets

OTHER PUBLICATIONS

M. L. Hetland et al., "Temporal rule discovery using genetic programming and specialized hardware," in Proc. of the 4th Int. Conf. on Recent Adv. in Soft Comp. (RASC), 2002.

M. Hirao et al., "A practical algorithm to find the best episode patterns," Lecture Notes in Computer Science, vol. 2226, pp. 435-441, 2001.

C. Larizza, et al., "Temporal abstractions for Diabetic patient management," in Lecture Notes in Computer Science, 6th Conference on Artificial Intelligence in Medicine in Europe (E. Keravnou et al., eds.), vol. 1211, pp. 319-330, Springer-Verlag, London, UK, 1997.

M. Last et al., "Knowledge discovery in time series databases," IEEE Transactions on Systems, Man and Cybernetics, Part B, vol. 31, pp. 160-169, Feb. 2001.

J. Lin, E. Keogh et al., "Finding motifs in time series," in Temporal Data Mining Workshop Notes (K. P. Unnikrishnan et al., eds.), (SIGKDD, Edmonton, Alberta, Canada), 2002.

J. S. Liu et al., "Markovian structures in biological sequence alignments," Journal of American Statistics Association, vol. 94, No. 1-15, 1999.

H. Mannila et al., 'Discovery of frequent episodes in event sequences', Data Mining and Knowledge Discovery, vol. 1, No. 3, pp. 259-289, 1997.

Z. Tronicek, 'Episode matching', in Combinatorial Pattern Matching, pp. 143-146, 2001.

K. P. Unnikrishnan and R. Uthurusamy, eds., Temporal Data Mining Workshop Notes. SIGKDD, Edmonton, Alberta, Canada, Jul. 23, 2002.

M. Garofalakis et al, "Mining sequential patterns with regular expression constraints," IEEE Trans. on Knowledge and Data Eng., vol. 14, pp. 530-552, May 2002.

C..Bettini, X. S. Wang, S. Jajodia, and J. L. Lin, "Discovering Frequent event patterns with multiple granularities in time sequences," IEEE Transactions on Knowledge and Data Engineering, vol. 10, pp. 222-237, Mar. 1998.

D. Chudova and P. Smyth, "Pattern discovery in sequences under a Markovian assumption," in Conference on Knowledge Discovery in Data, Proceedings of the Eighth ACM SIGKDD International Conference on Knowledge Discovery and Data Mining, (Edmonton, Alberta, Canada), Jul. 2002.

D. L. Wang and B. Yuwono, "Anticipation-based temporal pattern generation," IEEE Transactions on Systems, Man and Cybernetics, vol. 25, No. 4, pp. 615-628, 1995.

\* cited by examiner

SYSTEM AND METHOD FOR TEMPORAL DATA MINING

TECHNICAL FIELD

The present disclosure relates to a system and method for temporal data mining. More particularly, it relates to a system and method for temporal data mining by employing automata to count frequent episodes.

BACKGROUND

Data sets with temporal dependencies frequently occur in many business, engineering and scientific scenarios. Some typical examples of temporal data include alarm sequences in a telecom network, transaction logs in a grocery store, web navigation history, genome sequence data, stock market or other financial transactions data, line status logs in a manufacturing plant or other log data from manufacturing systems, time-stamped warranty data, diagnostic data from automobiles, and customer relations data.

The widespread occurrence of temporal data series has brought attention to the general importance of the area of temporal data mining. One way to search for patterns of interest in time series data is to discover frequent (or repetitive) patterns in the data. Thus, a special class of temporal data mining applications, those having to do with frequent episodes, is of particular importance. A central idea of frequent episode discovery is to seek expressive pattern structures and fast discovery algorithms that render a discovery technique both useful as well as efficient in the data-mining context.

SUMMARY

A method, system, and apparatus for temporal data mining are disclosed. The method includes receiving as input a temporal data series including time-stamped data and a threshold frequency. An aspect of this technology is the defining of appropriate frequency counts for non-overlapping and non-interleaved episodes. Two frequency measures and embodiments for obtaining frequent episodes are described. The method includes finding all frequent episodes of a particular length in the temporal data series. The method includes steps executed in successive passes through the temporal data series. The steps include incrementing the particular length to generate an increased length, combining frequent episodes to create combined episodes of the increased length, creating a set of candidate episodes from the combined episodes by removing combined episodes which have non-frequent sub-episodes, identifying one or more occurrences of a candidate episode in the temporal data series, incrementing a count for each identified occurrence, determining frequent episodes of the increased length, and setting the particular length to the increased length. The method further includes producing an output for frequent episodes. In the method, a frequent episode is an episode whose count of occurrences results in a frequency meeting or exceeding the threshold frequency.

DETAILED DESCRIPTION

This disclosure describes a method, system, and apparatus for temporal data mining of frequent episodes in temporal data series. The method includes a step for receiving as input a series of temporal (i.e., time-stamped) data and a threshold frequency of occurrence for the episodes found in the course of the temporal data mining method. The method includes iterative steps of computing a set of frequent episodes from candidate episodes, and generating a set of candidate episodes from the frequent episodes for use in the next iteration. The method includes a further step of producing an output for frequent episodes. The threshold frequency determines whether an episode is frequent in the temporal data series: a frequent episode is one whose count of occurrences results in a frequency meeting or exceeding the threshold frequency.

The method, system, and apparatus are adapted to detect frequent or repetitive patterns in the form of sequential episodes in time stamped data series. An aspect of this technology is the defining of appropriate frequency counts for non-overlapping and non-interleaved episodes. Two frequency measures and embodiments for obtaining frequent episodes are described. The embodiments described here search through the temporal data series to detect non-overlapping and non-interleaved episodes which are frequent (according to these measures) in the temporal data series.

This invention may be embodied in the form of any number of computer-implemented processes and apparatuses for practicing those processes. Embodiments of the invention may be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 1:
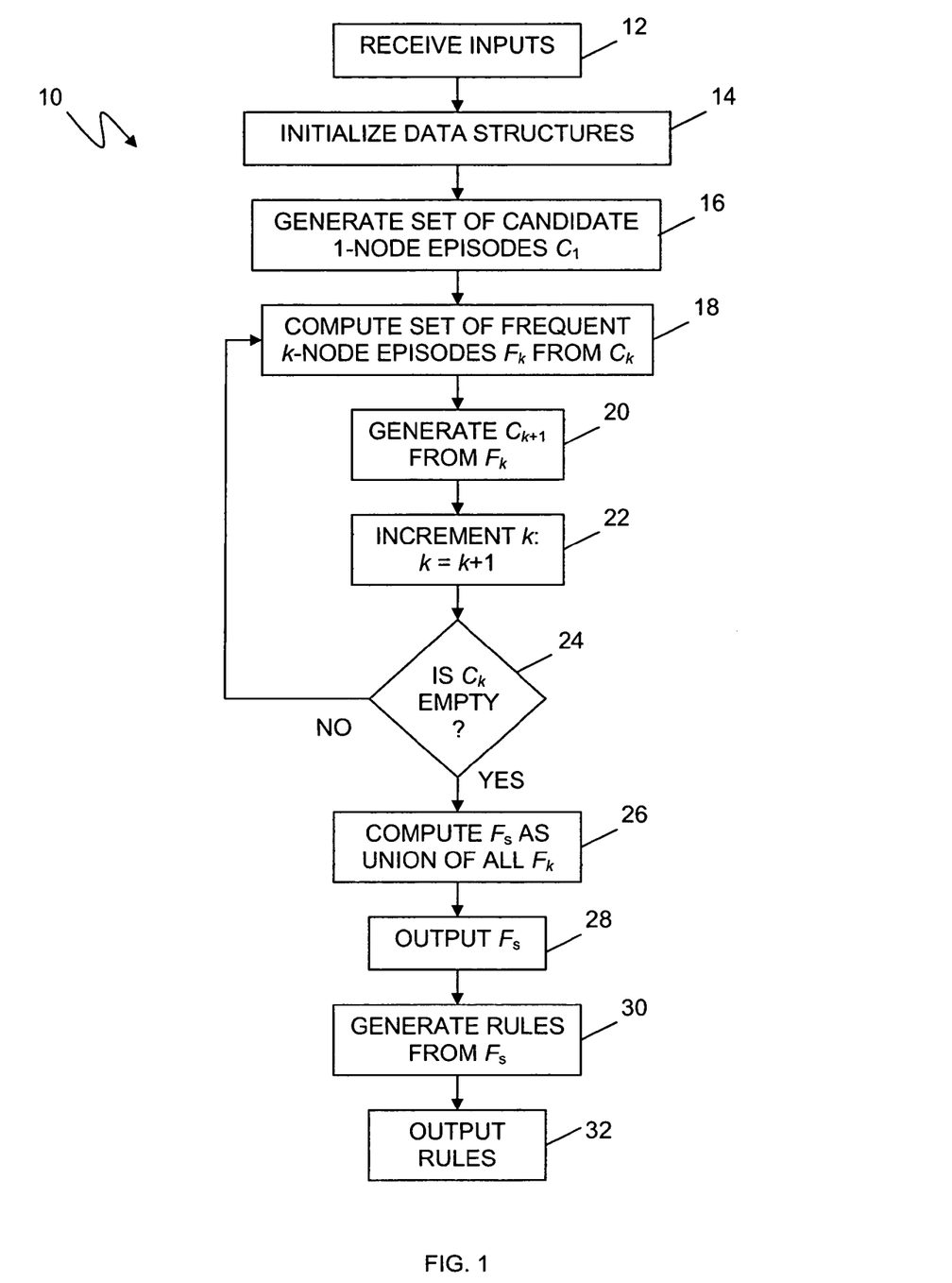
FIG. 1 shows a method for temporal data mining of a temporal data series.

FIG. 1 is a flowchart showing a method for temporal data mining. While the steps are in a particular order and show a particular manner to achieve results, the technology described herein can be implemented in other ways too. The method includes a step 12 for receiving as input a temporal data series and a threshold frequency. A set E of event types, an expiry time, and a confidence threshold may also be received as input in step 12. In a step 14, data structures for implementing the method are initialized. In a step 16, all frequent episodes of a particular length in the temporal data series are found. In step 16 also, the particular length is shown as one (1) in FIG. 1, but other values of length may be used.

Successive passes are made through the temporal data series to iteratively find all frequent episodes. This is shown at steps 18 to 24. In step 18, in the first iteration, all frequent episodes of length 1 are computed; in an iteration, in general, all frequent episodes of the particular length are computed at step 18. This is typically done by identifying one or more occurrences of a candidate episode in the temporal data series, incrementing a count for each identified occurrence, and determining frequent episodes from the counts of occurrence in comparison to the threshold frequency. Next, at step 20, frequent episodes of the particular length are combined in specific ways to produce combined episodes of an increased length. Typically, the increased length may be one more than the particular length. The combined episodes are tested, and those having subepisodes which are not frequent episodes are removed, to leave a set of candidate episodes for the next iteration. The iteration index is incremented at step 22, and may match the value of the increased length. The particular length may be reset to the increased length for the next iterative pass through the temporal data series. If no new candidate episodes are left after removing combined episodes having subepisodes which are not frequent episodes, iteration terminates at a step 24. The method continues at step 26 to compute the collection of all frequent episodes (i.e., frequent episodes of all lengths) by combining all the sets of frequent episodes found in the iteration steps 18 to 24. In a step 28, the set of all frequent episodes is provided as output of the method.

Also shown in FIG. 1 are a rule generation step 30 and a step 32 of producing output of the rules. Depending on details of the embodiment under consideration, the method 10 is capable of recognizing non-overlapping occurrences of episodes or non-interleaved occurrences of episodes. This capability is described in detail below in connection with FIGS. 2-7.

To describe mathematical details that are referenced herein, first is a description of some of the terms used.

Temporal data series discussed in this disclosure are made up of elements $(E_i, t_i)$, which are event type-time value pairs, that is, an event $E_i$ occurs at a time $t_i$. The time $t_i$ may be an integer. Temporal data series discussed in this disclosure are typically ordered so that events are arranged in order of increasing (or at least, nondecreasing) time value. An example generic temporal data series s as described herein may be denoted $<(E_1, t_1), \ldots (E_n, t_n)>$.

The temporal data series may also be denoted an event sequence $(s, T_s, T_e)$ with $T_s$ and $T_e$ fixing the lower and upper extremities of the event sequence. For the sake of notational succinctness this triple is denoted by s. The length n of the temporal data series may be denoted $|s|$. The events $E_i$ may be drawn from a set E of possible event types which may be provided as an input at step 12, as described above.

Example events may also be denoted herein by A, B, C, and so on. The associated time value(s) may be suppressed when the order of events is clear from the context, or when the order is not relevant to the discussion. An example event sequence of a temporal data series may be (A, 1), (B, 3), (C, 4), (E, 12), (A, 14), (B, 15), (C, 16).

An ordered sequence of events, e.g., (A→B→C), may be denoted an episode. The episode (A→B→C) is a three-node episode. An episode occurs in the temporal data series if the events of the episode occur in the temporal data series in the same order as in the episode.

Consider the example event sequence above and the three-node episode (A→B→C). The sequence of event-time value pairs (A, 1), (B, 3), (C, 16) is an occurrence of the episode, but the sequence (A, 14), (B, 3), (C, 4) is not an occurrence of the episode. There are altogether four occurrences of the episode (A→B→C) in the example event sequence.

The frequency of an episode can be defined in many ways. However, for a frequency count to be reasonable, its definition must guarantee that any subepisode is at least as frequent as the episode. A subepisode is a subsequence of an episode which has the same ordering as the episode. For example, the episode (A→C) is a subepisode of the episode (A→B→C), but the episode (C→B) is not.

An episode $\beta$ is a subepisode of the episode $\alpha$, and written $\beta \leq \alpha$, if there is a 1-to-1 map from the set of nodes of $\beta$ into the set of nodes of $\alpha$, with the following properties: First, for each node $v$ in $\beta$, the associated event is the same as the event associated with the image in $\alpha$ of $v$ under the 1-to-1 map. Second, the ordering of nodes is preserved under the mapping between $\alpha$ and $\beta$; that is, for each pair of nodes $v$ and $\omega$ in $\beta$, with $v$ preceding $\omega$ in the episode $\beta$, the node in $\alpha$ to which $v$ is mapped precedes the node in $\alpha$ to which $\omega$ is mapped.

A strict subepisode $\beta$ of an episode $\alpha$ is a subepisode for which equality with $\alpha$ does not hold, i.e. $\beta \leq \alpha$ and $\beta \neq \alpha$. A strict subepisode may be denoted by $\beta \prec \alpha$. When $\beta < \alpha$, $\alpha$ may also be denoted a superepisode of $\beta$, and written $\alpha \geq \beta$. Similarly, a strict superepisode may be denoted $\alpha \succ \beta$.

One way of defining the frequency of occurrence of an episode in a temporal data series may be by counting the number of occurrences and dividing by the length of the temporal data series. The example event sequence above has a length of 7. Thus the episode (A→B→C) occurring 4 times in the event sequence results in a frequency 4/7.

A non-overlapping occurrence of an episode is one where no event of the episode occurs between two events of another occurrence of the episode. For example, there are two non-overlapping occurrences of the episode (A→B→C) in the sequence (A, 1), (B, 3), (C, 4), (E, 12), (A, 14), (B, 15), (C, 16). To forestall arbitrarily large memory and processor time consumption, only the innermost occurrence of (A→B→C) need be tracked in a sequence like (A, 1), (B, 2), (A, 3), (B, 4), (A, 7), (B, 8), . . .

A non-interleaved occurrence of an episode may be defined as follows. Each occurrence of an episode is may be considered as a 1-to-1 map, h, from the nodes of the episode to events in the temporal data series. For an episode $\alpha$, the number of nodes in $\alpha$ may be denoted by $|\alpha|$ and the ordered sequence of nodes of $\alpha$ may be referred to as $v_1, v_2, \ldots$. The $j^{th}$ node of the episode $\alpha$ may also be denoted herein as $\alpha[j]$.

Let $h_1$ and $h_2$ denote two different occurrences of $\alpha$. Thus, $h_1(v_i)$ denotes the event in the temporal data series that corresponds to the node $v_i$ of the episode $\alpha$ in the occurrence represented by $h_1$. By $h_1(v_i) < h_2(v_j)$ is meant that the event (in the temporal data series) corresponding to node $v_i$ in occurrence $h_1$ has an earlier occurrence time than that of the event corresponding to node $v_j$ in occurrence $h_2$.

Two occurrences, $h_1$ and $h_2$ of an episode $\alpha$ are said to be non-interleaved if either $h_2(v_j) > h_1(v_{j+1})\ \forall j,\ 1 \leq j < |\alpha|$ or $h_1(v_j) > h_2(v_{j+1})\ \forall j,\ 1 \leq j < |\alpha|$.

As an example, the event sequence (A, 1), (B, 2), (D, 4), (A, 5), (C, 7), (B, 11), (C, 15) contains two non-interleaved occurrences of the episode (A→B→C) namely, <(A, 1), (B, 2), (C, 7)> and <(A, 5), (B, 11), (C, 15)>. The A event of the second non-interleaved occurrence occurs in the event sequence after the B event of the first non-interleaved occurrence, and the B event of the second non-interleaved occurrence occurs in the event sequence after the C event of the first non-interleaved occurrence.

In the embodiments discussed below, automata are used to identify and recognize occurrences of candidate episodes. In terms of the automata that recognize each occurrence, this definition of non-interleaved means the following. An instance of the automaton for a candidate episode α can transit into the state corresponding to a node, say $v_2$, only if an earlier instance (if any) of the automaton has already transited into state $v_3$ or higher. Non-interleaved occurrences would include some overlapped occurrences though they do not include all occurrences.

The definition introduced above for frequency of occurrence of an episode in a temporal data series can be refined by considering an episode to have occurred only if its occurrence meets the criteria for a non-overlapping occurrence, or meets the criteria for a non-interleaved occurrence. Which of these two different criteria are intended is clear from the context in the discussion below. The definitions of non-overlapping occurrences and non-interleaved occurrences thus provide two new frequency measures to apply to episode occurrence in a temporal data series.

The general procedure for discovering frequent episodes is as follows. First all frequent 1-node episodes in the temporal data series are found. Then these are combined in all possible ways to make candidate 2-node episodes. By calculating the frequencies of these candidates, all frequent 2-node episodes are obtained. These are then used to obtain candidate 3-node episodes and so on. The general method provides a reduced number of passes over the data series. The main computationally intensive step in frequent episode discovery is that of calculating the frequency of sets of candidate episodes. The computational burden may be reduced by using as few database passes as possible.

The method, system, and apparatus for temporal data mining of frequent episodes described herein are adapted to detect frequent or repetitive patterns in the form of sequential episodes in time stamped data series. As explained above, an episode or pattern is frequent if its detected occurrences meet or exceed a frequency value specified by a user of the method, system, or apparatus.

Returning now to FIG. 1, the process of computing the set of all frequent episodes is incremental and is done through the steps shown in FIG. 1. In step 12, a temporal data series including time-stamped events is received as input. The temporal data series may be recorded in a database and the entire data series read into memory at the outset at step 12. That is to say, the processing of the temporal data series may occur offline, and not in real time. In this way, events under consideration may be examined later after identification by the method described here.

Also in step 12, a threshold frequency λ is received as input. An expiry time $t_x$ and a confidence threshold $\rho_{min}$ may also be received as inputs. A set E of event types may be provided as well in the input at step 12.

Data structures of use in implementing the method may be initialized in a step 14. These data structures may include, but are not limited to, arrays, lists, flags, etc. as appropriate. In particular a variable $F_s$ to hold frequent episodes found in the temporal data series is initialized to be empty.

After steps of receiving inputs 12 and initializing data structures 14, the iterative process of scanning through the temporal data series starts with the set $C_1$ of all possible 1-node episodes, at step 16. This may be determined by first finding the set of all distinct event types occurring in the temporal data series.

Let $F_1$ be the collection of frequent episodes in $C_1$. Once $F_1$ is obtained, the collection $C_2$ of candidate 2-node episodes is generated from it. This incremental process of first obtaining $F_k$ from the candidates in $C_k$ and then generating $C_{k+1}$ from $F_k$ is repeated till the set of new candidates generated is empty. Generation of frequent episodes $F_k$ from candidates $C_k$ is explained below in connection with FIGS. 2-7, while generation of candidates $C_{k+1}$ from $F_k$ is explained below in connection with FIGS. 8-11.

Figure 2:
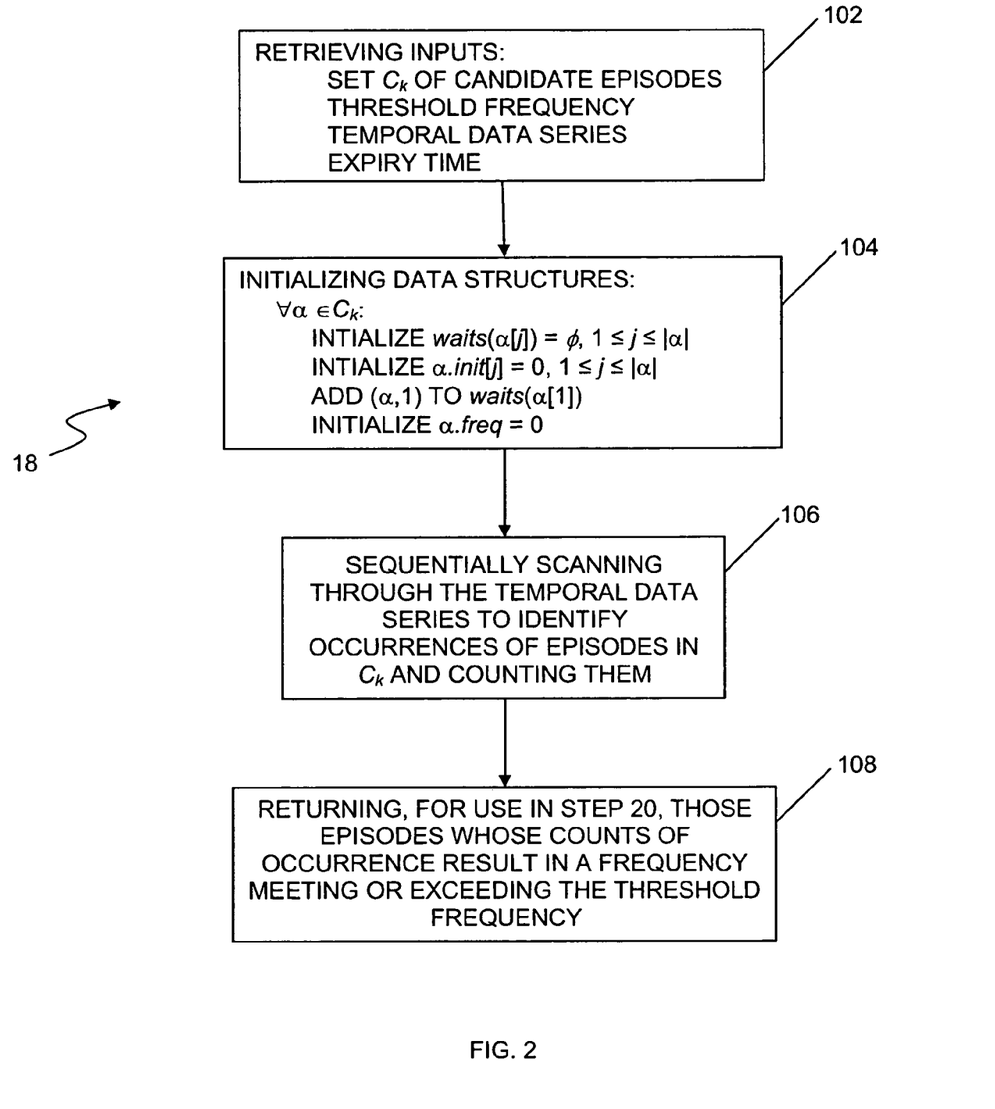
FIG. 2 shows a flowchart depicting a method for detection of frequent episodes in temporal data series.

Now turning to FIG. 2, step 18 of FIG. 1 may include a step of retrieving inputs 102. These inputs may include, but are not be limited to, a temporal data series s including events with associated time values, a set $C_k$ of candidate episodes to be sought in the temporal data series, a threshold value λ for occurrence frequency of an episode in the temporal data series, and an expiry time $t_x$.

In step 18, as will be discussed below, the temporal data series is traversed one event at a time. In an embodiment of step 18 as described herein, a single pass of sequentially scanning through the temporal data series may suffice. While this detailed discussion presents certain opportunities to attain the results described herein, other steps in place of those described are possible, without exceeding the scope of this disclosure.

Additional data structures of use in implementing the method are initialized in a step 104. In this way a set of automata may be generated and initialized to provide for tracking whether a candidate episode occurs in the temporal data series. In addition, for each candidate episode, a count of occurrences may be initialized to zero.

To handle cases in which an event type occurs in consecutive positions in a candidate episode, a variable bag may be initialized to be empty of contents. The variable bag may be a list, an array of pointers, or other appropriate data structure. During practice of an embodiment of the method, the variable bag may hold elements denoted herein by (α,j), denoting an automaton of the episode α is waiting for a particular event type as its $j^{th}$ event.

There may be many candidate episodes and for each candidate episode there may be multiple occurrences. Thus, at any time there may be many automata waiting for many event types to occur. In order to traverse and access the automata efficiently, for each event type E in the set $C_k$, the automata that accept E are linked together in the list waits(E).

The variable waits(E) is preferably a list, but any other appropriate data structure may be employed. Like the variable bag, the waits(E) list may contain entries of the form (α,j). In the case of waits(E), an entry (α,j) means that an automaton of the episode α is waiting for event type E as its $j^{th}$ event. That is, if the event type E occurs now in the event sequence, this automaton would accept it and transit to the jth state. At any time (including at the start of the counting process) there may be automata waiting for the event types corresponding to first nodes of all the candidate episodes. Accordingly, the waits(·) list is initialized as described below.

Further initialization takes place in step 104 by initializing a plurality of automata adapted to detect whether an episode of the set $C_k$ occurs in the temporal data series. Each episode $\alpha$ of $C_k$ may have $|\alpha|$ automata initialized, one for each node of the episode. The initialization of the automata includes adding an entry $(\alpha,j)$ to waits($\alpha[1]$), setting the episode count, $\alpha$.freq, to zero, and setting the initialization time $\alpha$.init[j], to zero for each $\alpha$-automaton. The initialization time is the time at which the first event of the episode occurred, for each instance of the automaton (for a given episode).

Further, it may be useful to prescribe an expiry time for episode occurrences, so that very widely spread out events would not be counted as an occurrence of some episode. This condition may be enforced in the method by testing the time taken to reach the new state before permitting a transition into it. This expiry time condition is an added facility in the method and the condition can easily be dropped. It may be noted that the scheme of retaining only the latest initialization time for the automata in a given state is consistent with this expiry time restriction. The expiry time may be provided as an additional input as shown in step 102 above.

Identifying occurrences of candidate episodes in the temporal data sequence is accomplished by sequentially searching through the data series with the plurality of automata at 106. This step is discussed in further detail below in connection with FIGS. 3 through 7. In brief, the automata occupy states corresponding to nodes of candidate episodes to track partial occurrences of the candidate episodes, with an automaton entering a final state when an entire occurrence of a candidate episode is detected in the temporal data series by that automaton. When a complete occurrence of a candidate episode has been tracked by an automaton, incrementing of an episode count for that candidate episode takes place. An automaton waiting for an event type makes a transition when that event type occurs, and the waits(·) list is accordingly updated. Multiple automata in the same state would be redundant, as they would only make the same transitions.

In an embodiment disclosed herein for counting non-overlapping occurrences, as described below, an automaton that reaches a common state most recently is retained, with other automata reaching the same state being discarded. A variable $\alpha$.init[j] may be used to store $|\alpha|$ initialization times for automata for the episode $\alpha$. The variable $\alpha$.init[j] indicates when an automaton for the episode $\alpha$ that is currently in its $j^{-th}$ state, becomes initialized, as previously discussed. If multiple instances transit to the same state j, only the most recent initialization time is stored. When a complete occurrence of an episode is identified by an automaton for that episode, all other automata that might have been initialized for that episode are reset, in this embodiment for counting non-overlapping occurrences. Accordingly, a collection of overlapping occurrences increments the frequency for the episode by exactly one.

In an embodiment disclosed herein for counting non-interleaved occurrences, as described below, all automaton that reach a common state may be retained, in general. The exception to this is when the state corresponds to the final event of a candidate episode. An automaton reaching that state is reset and the occurrence count for the episode is reset. As is done for counting non-overlapping occurrences, the variable $\alpha$.init [j] may be used to store $|\alpha|$ initialization times for automata for the episode $\alpha$, with the variable $\alpha$.init[j] indicating when an automaton for the episode $\alpha$ that is currently in its $j^{th}$ state, becomes initialized. For non-interleaved occurrences, if multiple instances transit to the same state j, multiple initialization times are stored. Also, when a complete occurrence of an episode is identified by an automaton for that episode, other automata that might have been initialized for that episode are retained, in general.

The step of producing results is shown in step 108. These results, including a determination of frequent episodes found in step 106, are for use in step 20 of FIG. 1.

In brief summary, referring to FIG. 2, there it is shown that step 102 performs retrieving of input, that step 104 performs initialization of data structures used in an embodiment, and that step 106 performs sequential scanning through the temporal data series so that the results may be produced for episodes identified as frequent as shown in step 108.

Continuing with description of FIG. 2, the step of producing an output for candidate episodes whose count of occurrences yields a frequency of occurrence meeting or exceeding the threshold frequency $\lambda$ provided in step 102, is shown at 108, as mentioned above.

Figure 3:
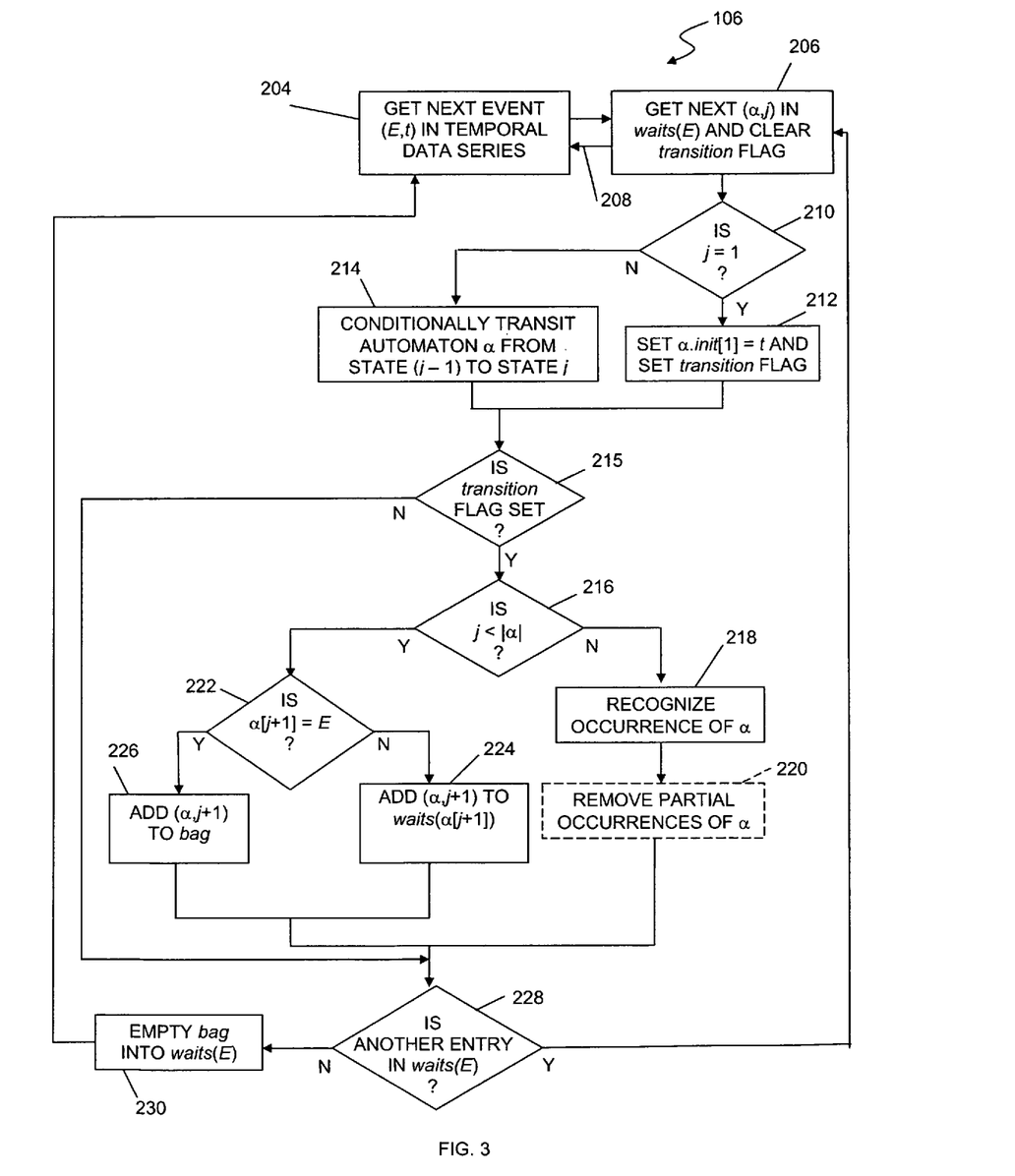
FIG. 3 shows further detail of the method of FIG. 2 according to two embodiments.

While FIG. 2 sets forth the details of step 18 in general terms, FIGS. 3-7 provide more detail of the steps in FIG. 2. For example, a more detailed depiction of step 106, identification of episodes occurring in the temporal data series, is shown in FIG. 3. In FIG. 3, at a step 204, the method retrieves the next element (E, t) in the temporal data series. The event E is then used in retrieval of waits(E), which is used in step 206. waits(E) contains an entry for each automaton awaiting an occurrence of an event of type E in the temporal data series. In the course of execution of the method, each entry in waits (E) is retrieved in turn, beginning with the first one. Retrieval of the entry is identified as step 206, where for the purpose of further discussion, the retrieved entry is identified as $(\alpha,j)$. A variable transition may be cleared, e.g., by setting its value to zero, in preparation for its use later in the method for indicating a state transition has occurred. When all elements of waits(E) have been retrieved, the method may branch at 208 to step 204 to retrieve the next element (E, t) in the temporal data series.

With $(\alpha,j)$, the method proceeds to a query 210 as to whether the state index j is 1 or not. If j=1, the method executes a step 212 in which the initialization time of the automaton for the episode is set to t. Also in step 212, the flag transition is set to indicate a state transition has occurred. If j is not 1, the method conditionally transits automaton $\alpha$ from state (j−1) (in which it was awaiting an event $\alpha$[j], that is, E) to a state j (in which it awaits an event $\alpha$[j+1]) at 214. Step 214, and the condition for a state transition in step 214, will be discussed more fully in connection with FIGS. 4 and 5.

If a state transition has taken place in step 212 or step 214 so that the transition flag is set 215, a query 216 is made as to whether the state index j is less than the number of nodes in the episode or not (if not, then j equals the number of nodes in the episode, by the logic disclosed herein). If j=$|\alpha|$, then an occurrence of episode $\alpha$ is recognized 218. Step 218 is discussed more fully below in connection with FIG. 6.

In an embodiment adapted to count non-overlapping occurrences of candidate episodes, a step 220 is executed in which automata in states corresponding to partial occurrences of the episode $\alpha$ are removed. Step 220 is discussed more fully below in connection with FIG. 7. In an embodiment adapted to count non-interleaved occurrences of candidate episodes, execution of step 220 is absent. Thus, in an embodiment in which non-interleaved occurrences are identified, the method does not reset all instances of an episode if one instance of it reaches the final state. Accordingly, in such an embodiment some overlapping occurrences of a candidate episode may be counted, so long as a previous instance has transited at least one state more than the next instance.

Returning to discussion of step 216, if j<|α|, then a further query 222 is made as to whether the next event of episode α might also be an event of type E. If not, then an entry (α, j+1) is added to waits(α[j+1]) (which is a distinct waits(·) list, since α[j+1]≠E).

If, on the contrary, the next event of episode α is again an event of type E, that is, α[j+1]=E, then an entry (α,j+1) is added to the variable bag. Since the method retrieves entries in waits(E) in turn (at step 206), and sets the initialization time (at step 212), sequestering the entry (α,j+1) in bag instead of simply adding it to waits(α[j+1]), which would be waits(E) in this case, precludes incorrectly overwriting the initialization time for the episode.

Following 218 (for an embodiment counting non-interleaved occurrences), step 220 (for an embodiment counting non-overlapping occurrences), step 224, or step 226, the system at 228 may branch to step 206 to retrieve the next entry in waits(E) if one is available. Returning to step 215 above, if a state transition has not taken place in step 212 or step 214, the method branches to step 228.

If a next entry is not available in waits(E), the method instead branches to a step 230 in which the contents of the variable bag are transferred into waits(E). Note that bag may be empty under some circumstances. Following that, the method returns to step 204 to retrieve the next element (E, t) in the temporal data series.

If the temporal data series is exhausted upon return to step 204, execution of step 106 finishes, and the method may continue with step 108 in FIG. 2.

Figure 4:
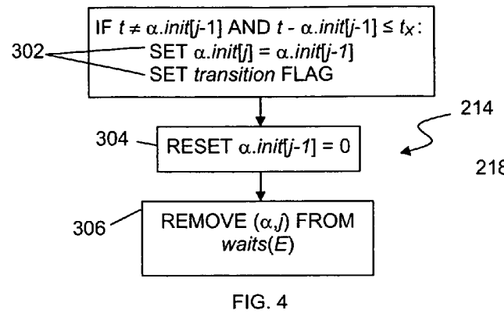
FIG. 4 shows detail of the step of transiting an automaton shown in FIG. 3 for an embodiment in which non-overlapping occurrences of episodes are tracked.

Turning now to FIG. 4, details of step 214 are shown for an embodiment in which non-overlapping occurrences of candidate episodes are tracked and identified. Conditionally, the automaton makes a transit from state j−1 to state j. The condition is that at least some nonzero time has transpired since initialization of the automaton. In an embodiment where an expiry time is input, the condition also includes a test that less than the prescribed expiry time has transpired since the automaton was initialized. In this way the expiry time may provide a criterion for timely occurrence of an episode. The automaton makes a transition from state j−1 to state j by the following actions at a step 302: the initialization time is shifted from α.init[j−1] to α.init[j], and the flag transition is set. At a step 304, the variable α.init[j−1] is reset to zero. The entry (α,j) is removed from waits(E) at 306.

Steps 304 and 306 occur unconditionally, in contrast to step 302. Although step 306 is shown as following step 304, step 306 may instead occur before step 302, or between step 302 and step 304. The significant order of steps in FIG. 4 is that step 304 follow step 302, if step 302 occurs.

Figure 5:
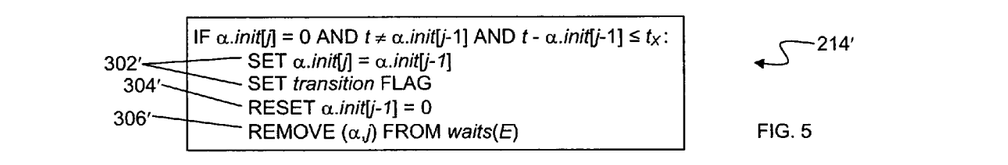
FIG. 5 shows detail of the step of transiting an automaton shown in FIG. 3 for an embodiment in which non-interleaved occurrences of episodes are tracked.

Turning now to FIG. 5, details of a step 214' are shown for an embodiment in which non-interleaved occurrences of candidate episodes are tracked and identified. As in FIG. 4, conditionally the automaton makes a transit from state j−1 to state j. The condition now is that at least some nonzero time has transpired since initialization of the automaton, and that no automaton for that episode is already in state j. This may be determined, for example, by checking that α.init[j] is zero. Thus in an embodiment for identifying non-interleaved occurrences, the method does not permit a transition into a particular state (except the first state) if there is already an instance of the automaton waiting in that state. In other words, while it still uses only one automaton per state, it does not forget an earlier initialization of the automaton until that has transited to the next state.

There may be many sets of non-interleaved occurrences of an episode in the event sequence. The embodiment as disclosed herein for counting non-interleaved occurrences counts that set of non-interleaved occurrences, which includes the first occurrence of the episode in the event sequence.

In an embodiment where an expiry time is input, the condition may also include a test that less than the prescribed expiry time has transpired since the automaton was initialized, as also shown in FIG. 5. In this way the expiry time may provide a criterion for timely occurrence of an episode. The automaton makes a transition from state j−1 to state j by the actions at step 302', 304', and 306'. The initialization time is shifted from α.init[j−1] to α.init[j], and the flag transition is set at 302'. At a step 304', the variable α.init[j−1] is reset to zero. The entry (α,j) is removed from waits(E) at 306'.

Steps 304' and 306' are conditional, along with step 302'. Although step 306' is shown as following step 304', step 306' may instead occur before step 302', or between step 302' and step 304'. The significant order of steps in FIG. 5 is that step 304' follow step 302'.

Figure 6:
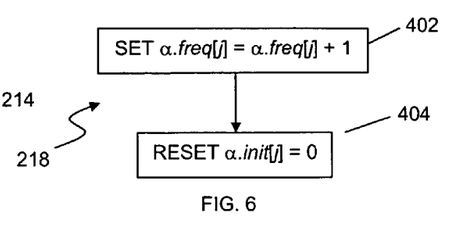
FIG. 6 shows detail of the step of recognizing an occurrence of an episode shown in FIG. 3.

Turning now to FIG. 6, details of step 218, recognizing an occurrence of episode α, are shown. At 402 the episode count for episode α is incremented by setting α.freq[j]=α.freq[j]+1. At step 404, the initialization time is reset to zero, α.init[j]=0. Although shown with step 402 preceding step 404, the two steps may occur in the opposite order.

Figure 7:
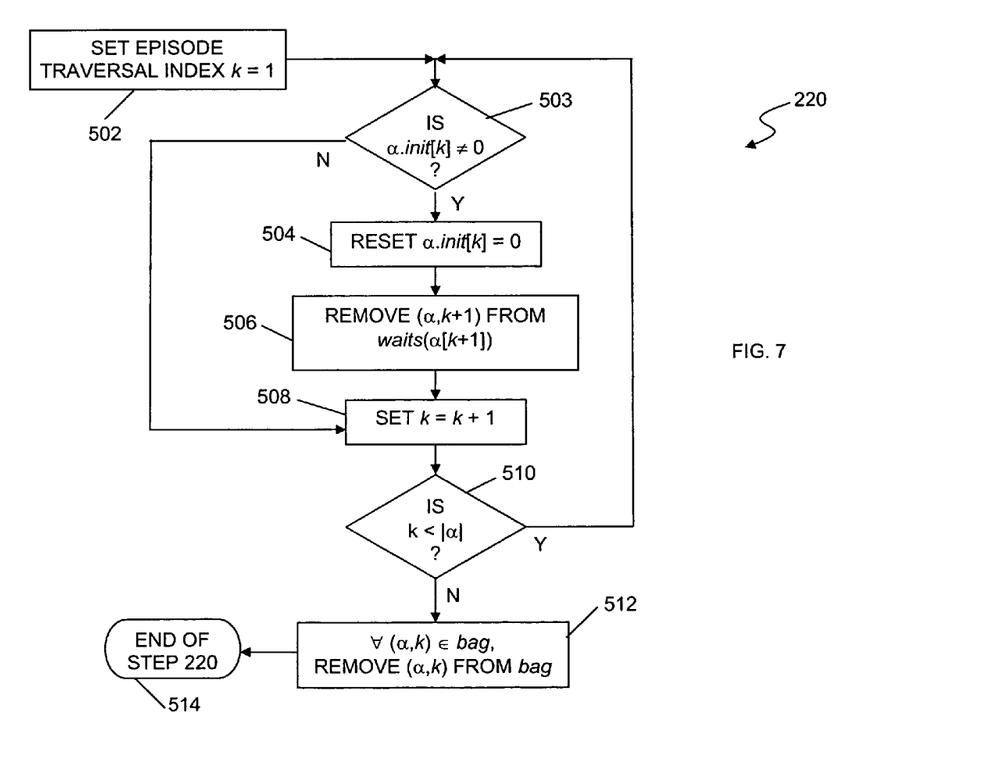
FIG. 7 shows additional detail of the step of removing partial occurrences of an episode shown in FIG. 3.

Turning now to FIG. 7, details of the step 220 of removing automata in states corresponding to partial occurrences of the episode α are shown. First, an episode traversal index k may be initialized to a value 1 at 502. Next, if the initialization time α.init[k] is nonzero 503, then at a step 504, the initialization time α.init[k] is reset to zero and at a step 506, the entry (α,k+1) is removed from waits(α[k+1]). Note that steps 504 and 506, if they occur, may occur in any order, although FIG. 7 shows step 504 occurring first. Next, the episode traversal index k is incremented, k=k+1 at 508. At 510 a query is made as to whether k<|α|. If so, a branch to step 503 is made, and execution continues therefrom. Otherwise, at a step 512, if the variable bag contains an entry (α,k) (for any α and k), the entry (α,k) is removed from bag. Following step 512, step 220 ends at 514.

In brief summary now, discussion of FIGS. 3-7 completes discussion of details of step 106 of FIG. 2. Two embodiments of the method were discussed, one for identification of non-overlapping episodes, and one for identification of non-interleaved episodes.

Turning now to further discussion of step 108 of FIG. 2, the variable $F_k$ is initialized to be empty. As described above in connection with step 18 of FIG. 1, the variable $F_k$ is intended to hold frequent episodes of length k. Each frequent k-node episode α is added to $F_k$, typically inserted in some order to facilitate generation of candidate episodes.

Figures 8, 9:
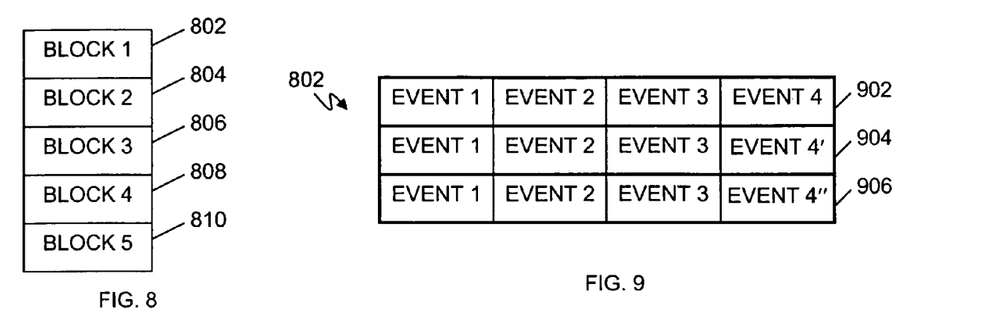
FIG. 8 shows an arrangement of blocks in the data structure $F_k$ of frequent episodes of length k.
FIG. 9 shows an ordering of frequent episodes within a block of $F_k$.

One arrangement of episodes in $F_k$ is shown in FIG. 8. FIG. 8 displays a set of blocks 802, 804, 806, 808, and 810. The actual number of blocks to be used depends on details of the episodes in $F_k$.

Episodes in $F_k$ are sorted in some order. One possible order is lexicographic order. This may be appropriate when event types are considered as symbols and the symbols can be ordered as if listed in a dictionary. Any specific order will suffice, provided where an event is to be positioned in a set of events subject to the order is unambiguous.

The k-node frequent episodes may thus be arranged as a lexicographically sorted collection $F_k$ of k-length arrays. The $i^{th}$ episode in the collection may thus be $F_k[i][j]$ which refers to the event type association for $j^{th}$ node. The episode collection is viewed as constituted in blocks such that within each block in $F_k$ the first (k−1) nodes are identical, i.e., the event type of the first (k−1) nodes are the same for the episodes in a block. Potential (k+1)-node candidates are constructed by combining two episodes within a block as will be discussed below. The newly constructed (k+1)-node episode is declared a candidate only if every subepisode generated by dropping one of its nodes is already known to be frequent (and hence is in $F_k$).

When the episodes are ordered, $F_k$ typically has the structure shown in FIG. 8. Each block, e.g., 802, will include those episodes whose first k−1 events will be identical. This is shown in FIG. 9. In the example of FIG. 9, k=4. In FIG. 9, three episodes 902, 904, and 906 are shown as an example, each with four entries. Each of the three episodes has the same event type for a first entry, namely event 1 in FIG. 9. For all three episodes 902, 904, and 906, the second entry is event 2, as shown. This pattern continues within a block until the last entry of the episodes. In FIG. 9, for example, episode 902 has a last entry event 4, while episode 904 has a last entry event 4'. Episode 906 has a last entry event 4".

Adopting episode ordering as the structuring principle for $F_k$ has a benefit that when a new episode α is determined, it readily may be inserted into $F_k$ in the appropriate block.

Figure 10:
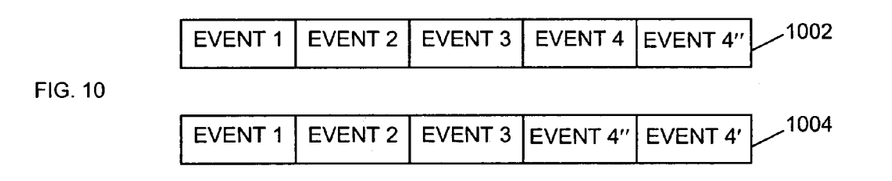
FIG. 10 shows example candidate blocks of length k+1 generated from frequent episodes shown in FIG. 9.

The block structure of $F_k$ also facilitates generation of new candidate episodes from frequent episodes. FIG. 10 shows example new candidate episodes 1002 and 1004 generated from episodes 902, 904, and 906 of FIG. 9.

Candidate episodes 1002 and 1004 have their first k−1 entries in common. In the example shown, they have their first three entries in common. For their last two entries, one each is drawn from the last entry of 902, 904, or 906. As shown, candidate episode 1002 includes the last entries of episode 902 and 906, and candidate episode 1004 includes the last entries of 906 and 904.

Figure 11:
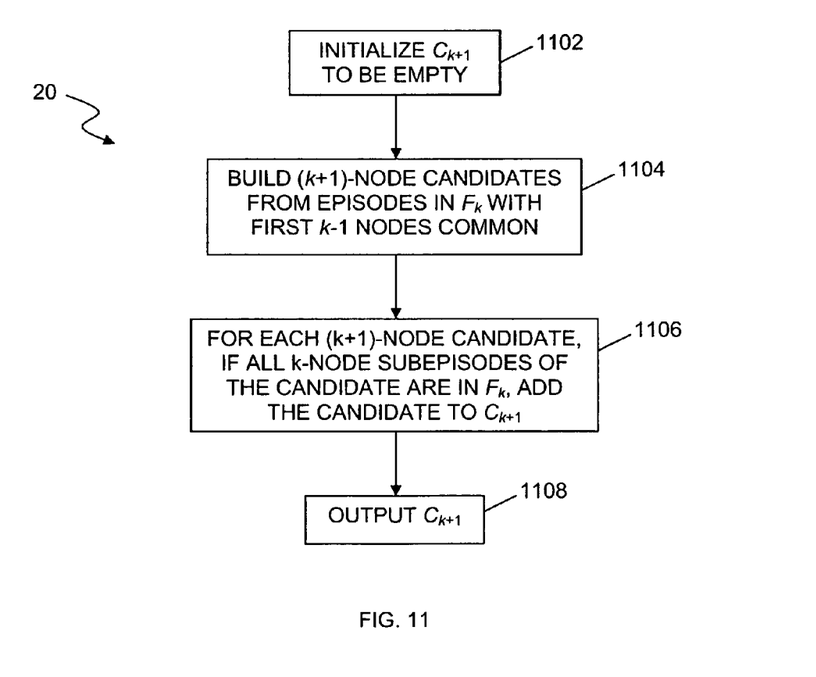
FIG. 11 shows additional detail of the step of generating candidate episodes of length k+1 from frequent episodes of length k.

FIG. 11 shows details of step 20 of FIG. 1. In FIG. 11, the candidate generation is done through the steps shown. First, at 1102, the collection $C_{k+1}$ of candidate episodes of length k+1 is initialized to be empty. At 1104, (k+1)-node candidate episodes are built from frequent episodes of length k, as discussed above. A newly constructed (k+1)-node episode is declared a candidate only if every subepisode generated by dropping one of its nodes is already known to be frequent (and hence is in $F_k$).

Thus, at step 1106, for each (k+1)-node candidate episode, k+1 k-node subepisodes are constructed by omitting one of the nodes of the (k+1)-node candidate episode. If each of these k+1 k-node subepisodes are in $F_k$, the (k+1)-node candidate episode is added to $C_{k+1}$. At step 1108, the collection $C_{k+1}$ is returned as a result or output, and method 10 continues with step 22.

Returning now to step 30 of FIG. 1, the rule discovery process in the generalized framework of discovery of frequent episodes can be described in the following form. As above, $F_s$ denotes the set of all frequent episodes in s. The rules take the form β→α, where β≺α and α, β∈$F_s$. To obtain such rules all the frequent episodes in the event sequence s are first computed (see step 26). For each such frequent episode-subepisode pair, α, β∈$F_s$, with β<α, the subepisode is said to imply the episode if the ratio of their frequencies of occurrence in the event sequence exceeds a confidence threshold $\rho_{min}$.

Figure 12:
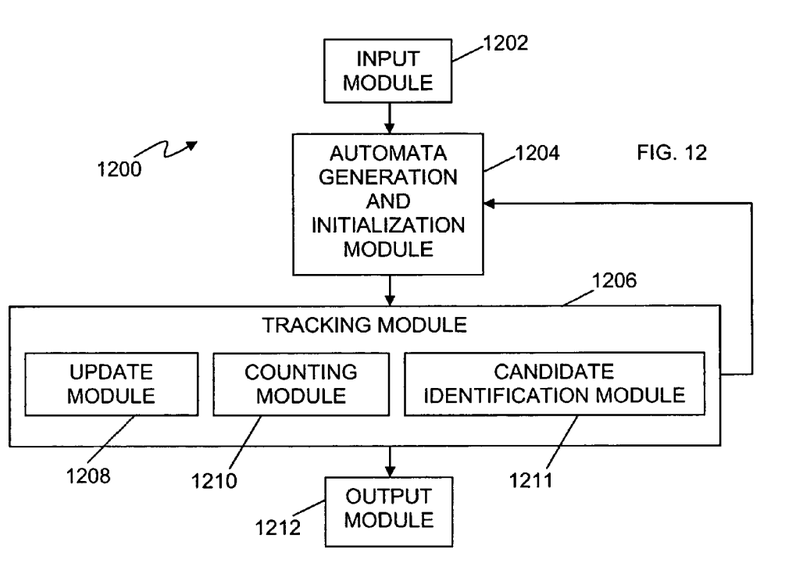
FIG. 12 depicts an exemplary system of this invention.

FIG. 12 shows a system 1200 in accordance with an embodiment of the invention. In FIG. 12, an input module 1202 provides for accepting input of a temporal data series. The temporal data series may be retrieved by input module 1202 from, e.g., a database. Input module 1202 in addition provides for accepting input of a threshold frequency and confidence threshold as well as an expiry time.

System 1200 may also include an automata generation and initialization module 1204 to provide a sufficient number of automata, properly initialized, for tracking occurrences of candidate episodes in the temporal data series. As discussed previously, in general, as many as |α| automata for a particular episode α may be used to track all partial occurrences of the episode α.

A tracking module 1206 manages, in an update module 1208, the automata tracking events of the data series through the transitions they make, and counts occurrences of detected occurrences of candidate episodes in counting module 1210. Candidate identification module 1211 provides for detection of the occurrences. Tracking module 1206 may branch back to module 1204 for continued generation and/or initialization of automata.

An output module 1212 provides for output for candidate episodes whose frequency of occurrence in the data series meets of exceeds the threshold frequency provided to input module 1202.

Figure 13:
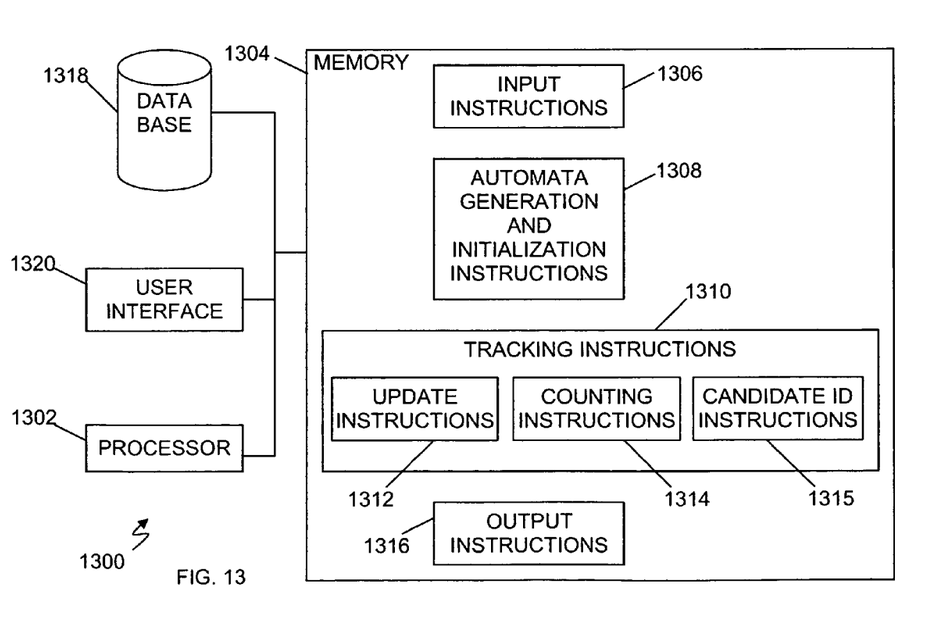
FIG. 13 depicts an exemplary apparatus of the present invention.

FIG. 13 shows an apparatus 1300 in accordance with an embodiment of the invention. In FIG. 13, a processor 1302 processes instructions stored in memory 1304 at 1306, 1308, 1310, 1312, 1314, and 1316. Processor 1302 executes the instructions to process temporal data retrieved from database 1318 in accordance with input provided through user interface 1320.

In summary, the temporal data mining technology as described herein provides a method, system, and apparatus to search for patterns of interest in time series data. As described in detail above, the method includes a step for receiving as input a series of temporal (i.e., time-stamped) data, a set of candidate episodes to be sought in the data series, and a threshold frequency of occurrence for the candidate episodes. The method also includes a step of generating automata adapted to track whether a candidate episode occurs in the temporal data series, and then tracking, with the automata, whether the episode occurs in the temporal data series. The method includes a further step of incrementing a count when an occurrence of the episode has been tracked by the automaton and a step of producing an output for candidate episodes whose count of occurrences results in a frequency exceeding the threshold frequency.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A computer-readable storage medium tangibly embodying executable instructions for:
  receiving as input a temporal data series comprising events with start times and end times, a set of allowed dwelling times, a threshold frequency of occurrence, and an expiry time, wherein the expiry time provides a criterion for occurrence of an episode;
  finding all frequent episodes of a particular length in the temporal data series having dwelling times, as determined by the start and end times, within the allowed dwelling times, wherein a frequency of an episode is defined by counting the number of occurrences and dividing by the length of temporal data series;
  in successive passes through the temporal data series:
    incrementing the particular length to generate an increased length;
    combining frequent episodes to create combined episodes of the increased length;
    creating a set of candidate episodes from the combined episodes by removing combined episodes which have non-frequent sub-episodes;
    identifying one or more occurrences of a candidate episode in the temporal data series, wherein the identifying comprises tracking, with a plurality of automata, whether an occurrence of a candidate episode occurs in the temporal data series;
  generating a plurality of automata configured to track a non-interleaved occurrence of a candidate episode and whether an occurrence of the candidate episode occurs in the temporal data series, wherein the non-interleaved occurrences include some overlapped occurrences but not all occurrences;
  incrementing a count for each identified occurrence;
  determining frequent episodes of the increased length;
  setting the particular length to the increased length; and
  producing an output for frequent episodes, wherein a frequent episode is an episode whose count of occurrences results in a frequency meeting or exceeding the threshold frequency of occurrence.

2. The method of claim 1, wherein the identifying comprises identifying whether a non-overlapping occurrence of a candidate episode occurs in the temporal data series.

3. The method of claim 1, wherein the plurality of automata are configured to track a non-overlapping occurrence of a candidate episode.

4. A system for temporal data mining, comprising:
  a computer readable storage medium that includes an application configured to:
    receive at an input module a temporal data series comprising events with start times and end times, a set of allowed dwelling times, and a threshold frequency of occurrence, wherein the input module receives an expiry time for providing a criterion for occurrence of an episode;
    identify, using a candidate identification and tracking module, one or more occurrences in the temporal data series of a candidate episode; find all frequent episodes of a particular length in the temporal data series having dwelling times, as determined by the start and end times, within the allowed dwelling times, wherein a frequency of an episode is defined by counting the number of occurrences and dividing by the length of temporal data series;
    in successive passes through the temporal data series:
      increment the particular length to generate an increased length;
      combine frequent episodes to create combined episodes of the increased length;
      create a set of candidate episodes from the combined episodes by removing combined episodes which have non-frequent sub-episodes;
      identify one or more occurrences of a candidate episode in the temporal data series, wherein the identifying comprises tracking, with a plurality of automata, whether an occurrence of a candidate episode occurs in the temporal data series;
    generate, using an automata generation module, a plurality of automata configured to track a non-interleaved occurrence of a candidate episode and whether an occurrence of a candidate episode occurs in the temporal data series, wherein the non-interleaved occurrences include some overlapped occurrences but not all occurrences;
    increment a count for each identified occurrence;
    determine frequent episodes of the increased length;
    set the particular length to the increased length; and
  produce at an output module an output for those episodes whose count of occurrences results in a frequency meeting or exceeding the threshold frequency of occurrence.

5. The system of claim 4, wherein the candidate identification and tracking module identifies whether a non-overlapping occurrence of a candidate episode occurs in the temporal data series.

6. The system of claim 4, wherein the plurality of automata are configured to track a non-overlapping occurrence of a candidate episode.

7. An apparatus for temporal data mining, comprising:
  a processor for executing instructions;
  a memory device including instructions comprising:
  input instructions for receiving a temporal data series comprising events with start times and end times, a set of allowed dwelling times, a threshold frequency of occurrence, and an expiry time, wherein the expiry time provides a criterion for occurrence of an episode;
  candidate identification and tracking instructions for identifying one or more occurrences in the temporal data series of a candidate episode, finding all frequent episodes of a particular length in the temporal data series having dwelling times, as determined by the start and end times, within the allowed dwelling times, wherein a frequency of an episode is defined by counting the number of occurrences and dividing by the length of temporal data series;
  in successive passes through the temporal data series:
    increment the particular length to generate an increased length;
    combine frequent episodes to create combined episodes of the increased length;
    create a set of candidate episodes from the combined episodes by removing combined episodes which have non-frequent sub-episodes;
    identify one or more occurrences of a candidate episode in the temporal data series, wherein the identifying comprises tracking, with a plurality of automata, whether an occurrence of a candidate episode occurs in the temporal data series;

instructions for generating a plurality of automata configured to track a non-interleaved of a candidate episode and whether an occurrence of a candidate episode occurs in the temporal data series, wherein the non-interleaved occurrences include some overlapped occurrences but not all occurrences;

increment a count for each identified occurrence;

determine frequent episodes of the increased length;

set the particular length to the increased length; and output instructions for producing an output for those episodes whose count of occurrences results in a frequency meeting or exceeding the threshold frequency of occurrence.

8. The apparatus of claim 7, wherein the candidate identification and tracking instructions comprise instructions for identifying whether a non-overlapping occurrence of a candidate episode occurs in the temporal data series.

9. The apparatus of claim 7, wherein the plurality of automata are adapted to track a non-overlapping occurrence of a candidate episode.

* * * * *